(12) United States Patent
Joshi

(10) Patent No.: US 12,412,235 B2
(45) Date of Patent: Sep. 9, 2025

(54) SYSTEMS AND METHODS FOR VIDEO STYLE TRANSFER

(71) Applicant: Canva Pty Ltd, Surry Hills (AU)

(72) Inventor: Bhautik Jitendra Joshi, Lewisham (AU)

(73) Assignee: Canva Pty Ltd, Surry Hills (AU)

( * ) Notice: Subject to any disclaimer, the term of this patent is extended or adjusted under 35 U.S.C. 154(b) by 134 days.

(21) Appl. No.: 18/220,924

(22) Filed: Jul. 12, 2023

(65) Prior Publication Data

US 2024/0037697 A1    Feb. 1, 2024

(30) Foreign Application Priority Data

Jul. 28, 2022   (AU) ................................ 2022209306

(51) Int. Cl.
*G06T 3/10*    (2024.01)
*G06T 5/77*    (2024.01)

(52) U.S. Cl.
CPC ................. *G06T 3/10* (2024.01); *G06T 5/77* (2024.01); *G06T 2207/10016* (2013.01)

(58) Field of Classification Search
CPC ......... G06T 11/001; G06T 2207/10016; G06T 2207/20056; G06T 2207/20084; G06T 3/10; G06T 5/10; G06T 5/70; G06T 5/77; G06T 7/254
See application file for complete search history.

(56) References Cited

U.S. PATENT DOCUMENTS

| | | | |
|---|---|---|---|
| 2017/0256037 A1* | 9/2017 | Li | G06F 18/24147 |
| 2018/0089807 A1* | 3/2018 | Reusch | G06T 7/246 |
| 2018/0308220 A1* | 10/2018 | Otsuki | H04N 1/409 |
| 2018/0330476 A1* | 11/2018 | Omori | G06T 5/70 |

OTHER PUBLICATIONS

Examination Report No. 2 for Australian Patent Application No. 2022209306 mailed May 8, 2024, pp. 1-4.
Semmo, A et al. 'Image Stylization by Interactive Oil Paint Filtering' Jan. 2016 DOI: 10.1016/j.cag.2015.12.001, pp. 1-16.

(Continued)

*Primary Examiner* — Ming Wu
(74) *Attorney, Agent, or Firm* — GrowIP Law Group LLC

(57) ABSTRACT

Described herein is a computer implemented method including: accessing an input video; generating a first output frame corresponding to a first input frame by: generating a noise-added frame by processing the first input frame to add noise to any low-frequency regions; and processing the noise-added frame in accordance with a stylization algorithm to generate the first output frame; generating a second output frame corresponding to a second input frame, where the second input frame is subsequent to the first input frame and is generated by: calculating first optical flow data describing an optical flow between the first and second input frame; generating a first noise-preserved frame by using the first optical flow data to deform the noise-added frame; and processing the first noise-preserved frame in accordance with the stylization algorithm to generate the second output frame; and encoding the first and second output frame into output video data.

20 Claims, 5 Drawing Sheets

(56) References Cited

OTHER PUBLICATIONS

Anh, W. et al., "Flat-Region Detection and False Contour Removal in the Digital TV Display", 2005 IEEE International Conference on Multimedia and Expo, 2005, pp. 1-4.

Examination Report No. 1 for Australian Patent Application No. 2022209306 Mailed Jul. 17, 2023, pp. 1-6.

Litwinowicz, P., "Processing Images and Video for An Impressionist Effect", SIGGRAPH '97: Proceedings of the 24th annual conference on Computer graphics and interactive techniques, Aug. 1997, pp. 407-414.

Neel, Photoshop Tutorial: Add texture to flat image, published Dec. 28, 2011, pp. 1-12 [retrieved from internet on Jul. 17, 2023].

"A Learned Representation For Artistic Style," Vincent Dumoulin, Jonathon Shlens, and Manjunath Kudlurfrom (Feb. 9, 2017, arXiv:1610.07629), ICLR 2017, pp. 1-26.

"A Neural Algorithm of Artistic Style". Gatys, Leon A., Ecker, Alexander S., and Bethge, Matthias (Aug. 26, 2015, arXiv:1508.06576), pp. 1-16.

"Example-Based Synthesis of Stylized Facial Animations," Jakub Fišer et al., ACM Transactions on Graphics, vol. 36, No. 4, Article 155, Jul. 2017, pp. 1-11.

"Image Analogies," Aaron Hertzmann, Charles Jacobs, Nuria Oliver, Brian Curless, and David Salesin (Jun. 2001), pp. 1-14.

"Artistic Style Transfer for Videos," Manuel Ruder, Alexey Dosovitskiy, and Thomas Brox (Apr. 28, 2016, arXiv:1604.08610), pp. 1-14.

"Stabilizing neural style-transfer for video," Jeffrey Rainy, Element AI Lab, Feb. 12, 2018., pp. 1-9, https://medium.com/element-ai-research-lab/stabilizing-neural-style-transfer-for-video-62675e203e42 { (last visited Jul. 12, 2023).

"Two-Frame Motion Estimation Based on Polynomial Expansion," Gunnar Farneback (Jan. 1, 2003), pp. 1-8.

EbSynth FAQ, https://ebsynth.com/faq.html (last visited Jul. 7, 2023), pp. 1-5.

\* cited by examiner

SYSTEMS AND METHODS FOR VIDEO STYLE TRANSFER

CROSS-REFERENCE TO RELATED APPLICATION

This application is a U.S. Non-Provisional Application that claims priority to Australian Patent Application No. 2022209306, filed Jul. 28, 2022, which is hereby incorporated by reference in its entirety.

TECHNICAL FIELD

Aspects of the present disclosure are directed to systems and methods for video style transfer.

BACKGROUND

Image style transfer algorithms are known.

Such algorithms take a content image and a reference image and generate an output image in which the style of the reference image has been applied to the content image. By way of example, a user may have a photograph (the content image) and want to adjust the image so that it takes the appearance or characteristics of a particular artwork (e.g. the "The Starry Night" painting by Vincent Van Gough—the style image).

SUMMARY

Described herein is a computer implemented method including: accessing an input video; generating a first output frame corresponding to a first input frame of the input video by: generating a noise-added frame by processing the first input frame to add noise to any low-frequency regions of the first input frame; and processing the noise-added frame in accordance with a stylization algorithm to generate the first output frame; generating a second output frame corresponding to a second input frame of the input video, wherein the second input frame is subsequent to the first input frame and the second output frame is generated by: calculating first optical flow data describing an optical flow between the first input frame and the second input frame; generating a first noise-preserved frame by using the first optical flow data to deform the noise-added frame; and processing the first noise-preserved frame in accordance with the stylization algorithm to generate the second output frame; and encoding the first output frame and the second output frame into output video data.

Figure 1:
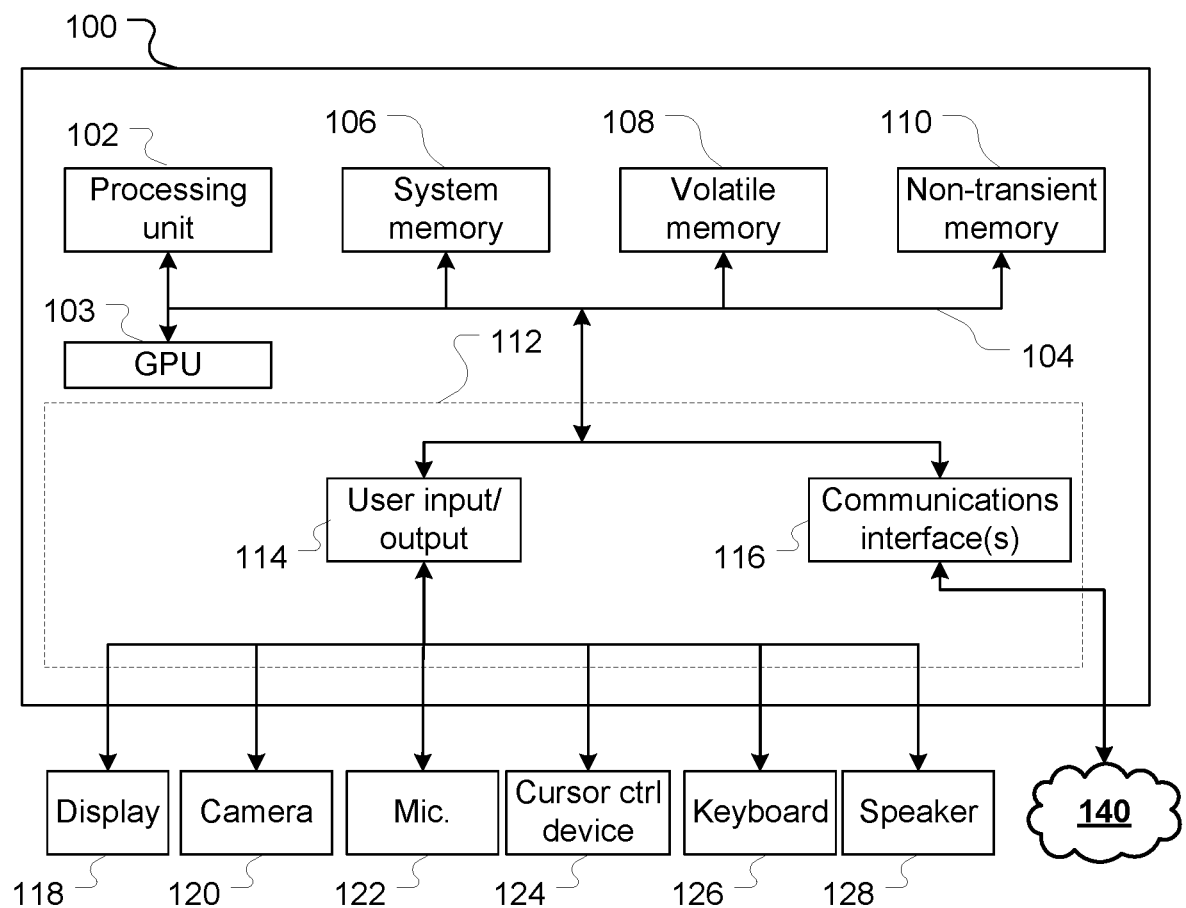
FIG. 1 is a block diagram of a computer processing system configured to perform various features of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is generally concerned with video style transfer.

As discussed above, image style transfer techniques take as input a content image and a reference image and generate an output image in which the style of the reference image has been applied to the content image. Many known style transfer algorithms make use of machine learning based techniques—for example neural style transfer algorithms which make use of deep neural networks.

By way of example, neural style transfer techniques are described in the paper "A Neural Algorithm of Artistic Style" by Gatys, Leon A., Ecker, Alexander S., and Bethge, Matthias (26 Aug. 2015, arXiv:1508.06576).

In contrast, the processing described herein takes a content video (or content video data) and reference image and generates an output video (or output video data) in which the style of the reference image has been applied to the content video.

One approach to video style transfer that has been tried is to treat each frame of the content video as an independent content image. Each frame of the content video frame is processed (with the reference image) according to an existing style transfer algorithm to generate a corresponding output frame. The output frames are then encoded back into a video format to generate the output video.

This approach, however, typically results in significant image instability between frames. This instability creates undesirable visual artefacts in the output video such as 'sizzling' and 'popping'.

Attempts to reduce or minimise such visual artefacts have been made. Attempts known to the inventor operate by modifying the loss function in the style transfer algorithm to stabilise the output. One example of such an attempt is described in the paper "Artistic Style Transfer for Videos" by Manuel Ruder, Alexey Dosovitskiy, and Thomas Brox (28 Apr. 2016, arXiv: 1604.08610).

At least in some cases, however, having to modify the loss function of a style transfer algorithm in order to apply the algorithm to video is undesirable, at least insofar as it requires a deep understanding of the style transfer algorithm and an ability to modify the algorithm. This may be beyond many users, and even if not requires substantial time and effort to do.

In contrast, the techniques described herein provide an approach to video style transfer that does not require any modification to or adaptation of the style transfer algorithm that is being used. Rather, the approach operates to allow any given input video to be automatically processed to make it suitable for processing by a style transfer algorithm (with no adjustment of the style transfer algorithm needed).

The processing described herein is performed by one or more computer processing systems that are configured to perform that processing. An example computer processing system 100 which is configurable to implement the embodiments and features described herein will be described with reference to FIG. 1.

System 100 is a general purpose computer processing system. It will be appreciated that FIG. 1 does not illustrate all functional or physical components of a computer processing system. For example, no power supply or power supply interface has been depicted, however system 100 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 100 includes at least one processing unit 102—e.g. a central processing unit 102. Computer processing system may also include a separate graphics processing unit (GPU) 103. In some instances, where a computer processing system 100 is described as performing an operation or function all processing required to perform that operation or function will be performed by processing unit 102. In other instances, processing required to perform that operation or function may be performed by the graphical processing unit 103. In still further instances, processing required to perform that operation or function may be performed by remote processing devices accessible to system 100.

Through a communications bus 104 the processing unit 102 (and, if present, GPU 103) is in data communication with a one or more machine readable storage (memory) devices which store computer readable instructions and/or data which are executed by the processing unit 102 (and/or 103) to control operation of the system 100. In this example system 100 includes a system memory 106 (e.g. a BIOS), volatile memory 108 (e.g. random access memory such as one or more DRAM modules), and non-transient memory 110 (e.g. one or more hard disk or solid state drives).

System 100 also includes one or more interfaces, indicated generally by 112, via which system 100 interfaces with various devices and/or networks. Generally speaking, other devices may be integral with system 100, or may be separate. Where a device is separate from system 100, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 100 may be configured for wired connection with other devices/communications networks by one or more of: USB; eSATA; Ethernet; HDMI; and/or other wired protocols.

Wireless connection with other devices/networks may similarly be by any appropriate standard or proprietary hardware and communications protocols. For example, system 100 may be configured for wireless connection with other devices/communications networks using one or more of: BlueTooth; WiFi; near field communications (NFC); Global System for Mobile Communications (GSM), and/or other wireless protocols.

Generally speaking, and depending on the particular system in question, devices to which system 100 connects—whether by wired or wireless means—include one or more input devices to allow data to be input into/received by system 100 and one or more output device to allow data to be output by system 100. Example devices are described below, however it will be appreciated that not all computer processing systems will include all mentioned devices, and that additional and alternative devices to those mentioned may well be used.

For example, system 100 may include or connect to one or more input devices by which information/data is input into (received by) system 100. Such input devices may include keyboard, mouse, trackpad, microphone, accelerometer, proximity sensor, GPS, and/or other input devices. System 100 may also include or connect to one or more output devices controlled by system 100 to output information. Such output devices may include devices such as a display (e.g. a LCD, LED, touch screen, or other display device), speaker, vibration module, LEDs/other lights, and/or other output devices. System 100 may also include or connect to devices which may act as both input and output devices, for example memory devices (hard drives, solid state drives, disk drives, and/or other memory devices) which system 100 can read data from and/or write data to, and touch screen displays which can both display (output) data and receive touch signals (input).

By way of example, where system 100 is an end user device (such as a desktop computer, laptop computer, smart phone device, tablet device, or other device) it may include a display 118 (which may be a touch screen display), a camera device 120, a microphone device 122 (which may be integrated with the camera device), a cursor control device 124 (e.g. a mouse, trackpad, or other cursor control device), a keyboard 126, and a speaker device 128.

System 100 also includes one or more communications interfaces 116 for communication with one or more networks, such as network 1410 (e.g. a local area network, a wide area network, a public network). Via the communications interface(s) 116, system 100 can communicate data to and receive data from networked systems and/or devices over a communications network 140.

System 100 may be any suitable computer processing system, for example, a server computer system, a desktop computer, a laptop computer, a netbook computer, a tablet computing device, a mobile/smart phone, a personal digital assistant, or an alternative computer processing system.

System 100 stores or has access to computer applications (also referred to as software or programs)—i.e. computer readable instructions and data which, when executed by the processing unit 102, configure system 100 to receive, process, and output data. Instructions and data can be stored on non-transient machine readable medium such as 110 accessible to system 100. Instructions and data may be transmitted to/received by system 100 via a data signal in a transmission channel enabled (for example) by a wired or wireless network connection over an interface such as communications interface 116.

Typically, one application accessible to system 100 will be an operating system application.

In addition, system 100 will store or have access to applications which, when executed by the processing unit 102, configure system 100 to perform various computer-implemented processing operations described herein. For example, in the present examples system 100 includes style transfer module 502. This may be a software module which is executed to configure system 100 to perform the processing described herein.

Figure 2:
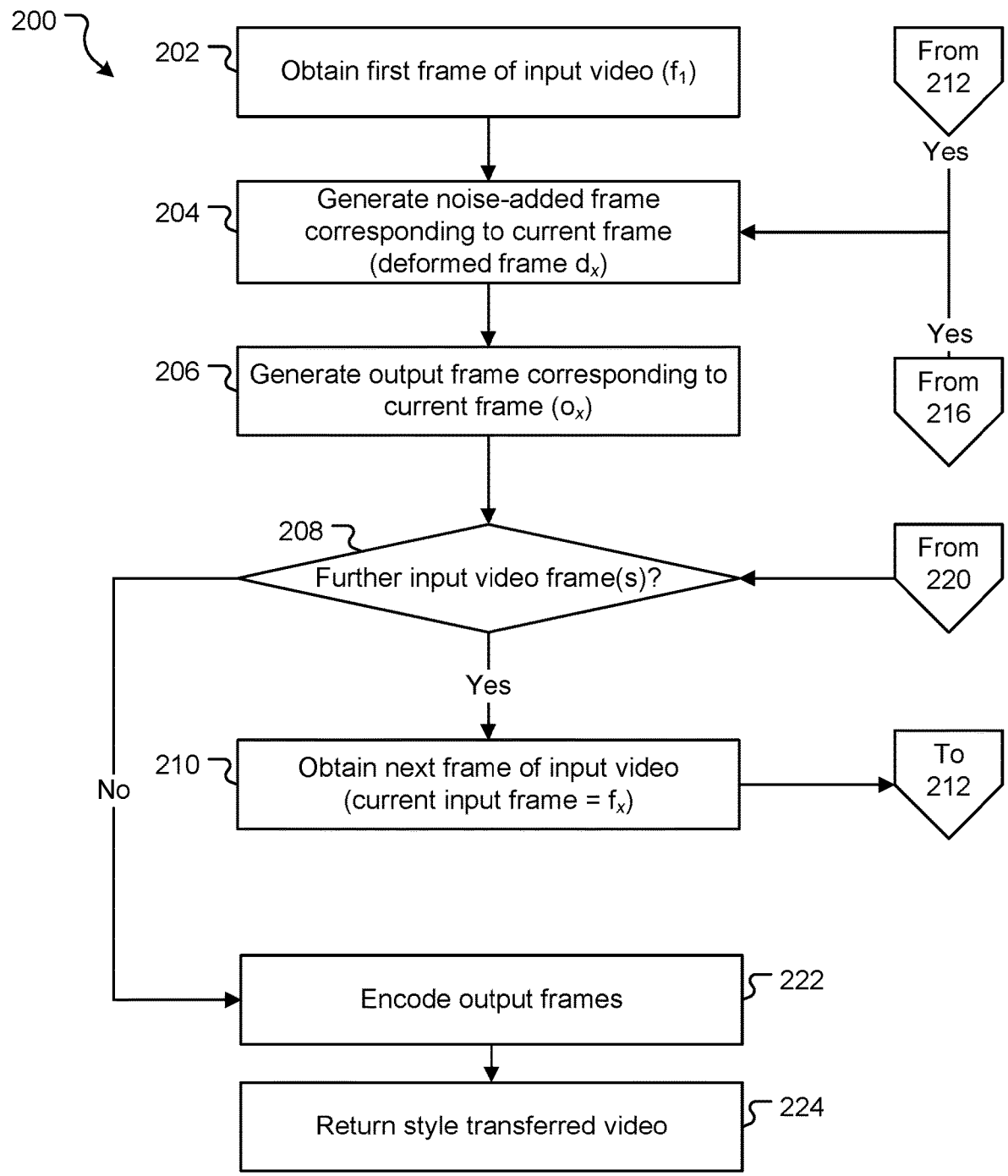
FIG. 2 depicts operations performed in a video style transfer method.
Figure 2:
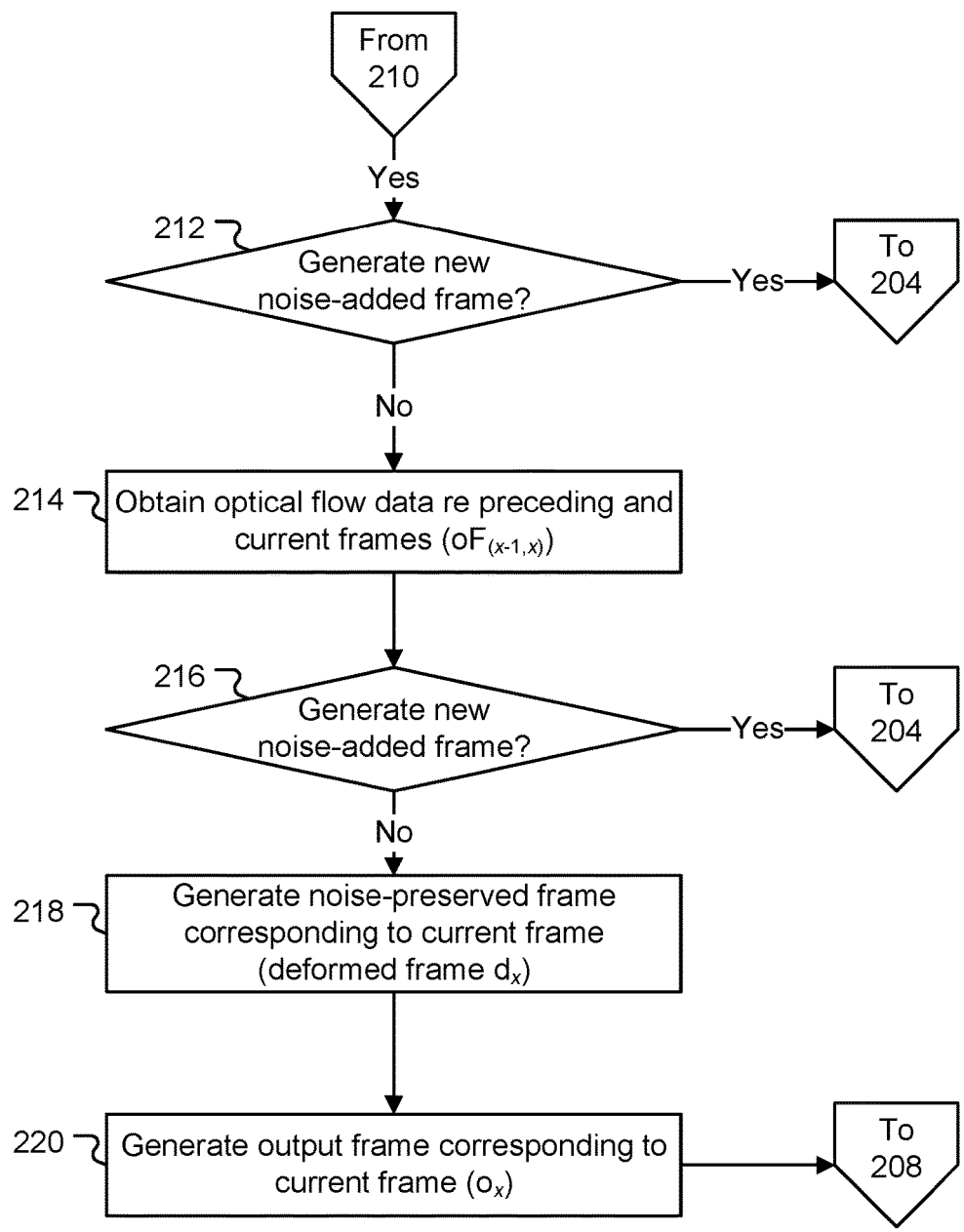

Turning to FIG. 2, a video style transfer method 200 will be described. The processing described in FIG. 2 is performed by a computer processing system such as system 100.

In this disclosure the terms "frame" and "image" are used interchangeably. Specifically, each frame of a video is an image. A frame (or image) may be stored or provided in any appropriate format—for example a two- or higher-dimensional image array providing pixel values for each pixel in the frame (or image). By way of example, common image formats that may be used are jpeg, bitmap, png, and EXR (though other formats may also be used).

In the present embodiments, a computer processing system such as 100 is configured to perform the processing described by a style transfer module 502. In certain implementations, the style transfer module 502 is a software module—i.e. data and computer readable instructions which are stored in memory (e.g. volatile memory 108) for execution by one or more processing units. Given the nature of the processing performed in accordance with method 200, the style transfer module 502 may cause certain processing to be performed by a graphics processing unit such as GPU 103. Processing may, however, be performed by a central processing unit such as CPU 102 (either alone or in conjunction with a GPU such as 103). Generally speaking, however, execution of the instructions causes the system 100 to perform the described operations.

In alternative embodiments, the style transfer module 502 may be (or include) a hardware module—i.e. specially configured hardware for performing some or all the operations of method 200.

Method 200 takes as input a video (or, specifically, video data). The input video is the video that is to be stylised by the style transfer process. Method 200 may be used with (or be adapted to be used with) digital videos of various formats—e.g. MPEG-4, MOV, WMV, AVI, and/or other video formats.

Method 200 also takes as inputs a reference image (or an identifier thereof). The reference image is the image that defines the style that is to be transferred to the input video. The reference image may be selected by a user via an appropriate user interface—e.g. a control that allows a user to search or browse for and select a reference image.

In certain embodiments, method 200 may be configured to utilise a single, predefined style transfer algorithm. In this case the same style transfer algorithm is used to process all input videos.

In alternative embodiments, method 200 may be configured to be able to use different style transfer algorithms. In this case a further input to method 200 is an identifier of the particular style transfer algorithm that is to be utilised. In this case, selection of a particular style transfer algorithm may, for example, be by a user interface (e.g. a drop-down list or other selection mechanism) that allows a user to select a particular style transfer algorithm from those that are available.

As noted above, method 200 is able to operate with any appropriate style transfer algorithm without requiring any alteration thereof. The techniques described herein are suited to machine learning style transfer algorithms. Examples of such algorithms include algorithms such as described in "A Neural Algorithm of Artistic Style" by Leon Gatys, Alexander Ecker, and Matthias Bethge (26 Aug. 2015, arXiv:1508.06576) and "A Learned Representation For Artistic Style" by Vincent Dumoulin, Jonathon Shlens, and Manjunath Kudlurfrom (https://arxiv.org/abs/1610.07629), though other machine learning based algorithms can be used. Furthermore, the techniques described here are also suitable for use with non-machine learning image transformation algorithms. By way of example, the techniques described here may be used (or be adapted to be used) with image transformation algorithms such as "Image Analogies" by Aaron Hertzmann, Charles Jacobs, Nuria Oliver, Brian Curless, and David Salesin (https://mrl.cs.nyu.edu/publications/image-analogies/analogies-72dpi.pdf).

At 202, the style transfer module 502 obtains the first frame of the input video. This may be by decoding the input video, or the frame may be provided to (obtained by) the style transfer module from a separate decoding process. Input frames will be denoted $f_x$—e.g. $f_1$ is the first frame, $f_2$ is the second input frame and so on.

At 204, the style transfer module 502 processes the current input video frame to generate what will be referred to as a noise-added frame. The noise-added frame will also be referred to as a deformed frame and denoted $d_x$—i.e. noise added frame $d_x$ corresponds to input frame $f_x$. Noise-added frames will typically be generated to be of the same image format as the input video frame.

Generally speaking, generating a noise-added (or deformed) frame $d_x$ involves identifying any low-frequency regions in the first frame and creating an image (the noise-added frame) in which noise has been added to those low frequency regions. This noise effectively creates texture in the low frequency areas.

In the present embodiment, the style transfer module 502 is configured to generate a noise-added frame according to an algorithm that, generally, operates as follows:

```
function addNoise(x):
    noiseStrength = 0.25 #this could be any value between 0 and 1
    frequencyImage = highPass(x)
    noiseImage = generateNoise( )
    noiseMask = noiseImage * (1.0 – frequencyImage)
    return noiseStrength (x*(1–noiseMask) + (1–x)*noiseMask) +
    (1.0–noiseStrength)* x
```

The algorithm takes as input an image x—i.e. the relevant input video frame.

A noiseStrength variable is defined which determines the strength of the noise that is ultimately added to the input frame to create the noise-added version thereof. The noiseStrength variable may be predefined. Alternatively, the noiseStrength variable may be a user-adjustable variable (in which case the noiseStrength to be used becomes another input to method 200). In this example, the noiseStrength variable is set to 0.25 but any value between 0 and 1 may be used.

Generally speaking, the noiseStrength variable can be used to dial in the added texture for stabilisation. The value selected for the noiseStrength variable presents a trade-off. Low noiseStrength values (i.e. closer to 0) will result in less significant noise artefacts in the final style-transferred video, but may provide for a less ideal style transfer process as low-frequency regions in the original video frames may not be as accurately tracked (because less texture is added to low-texture areas of the original video). In contrast, higher levels noiseStrength values (i.e. closer to 1) which result in more significant noise artefacts in the final style-transferred video (and have a greater impact on the aesthetic quality of the result), but may also provide for better style transfer as low-frequency regions in the original video may be more accurately tracked.

The frequencyImage (generated by the highPass function, also referred to as a frequency dataset) is an image (or, more particularly, an image dataset) representing a greyscale version of the input image with pixel values between 0 and 1. In the frequencyImage, a large pixel value will indicate a pixel that is in a region of high frequency information (e.g.

a region of the input image x with texture) while a low pixel values indicates a pixel that is in a region of low frequency information (e.g. a region of the input image x of uniform colour). To generate the frequencyImage, the highPass function of the present embodiment first generates a greyscale version of the input image—e.g. by converting the input image to greyscale or otherwise generates a greyscale version of the input image. The greyscale version of the image is then processed using a Fast Fourier Transform (FFT) algorithm to generate a FFT version of the input image. The frequency image is then generated by applying a bandpass filter to the FFT version of the input image. The bandpass filter is applied so that any pixel that defines a frequency within in a defined band is left alone, any pixel that defines a frequency below the band is clamped (or set) to zero, and any pixel that defines a frequency above the band is clamped (or set) to one. The frequencyImage is then the set of values following application of the bandpass filter (each value corresponding to a pixel in the original image). Any appropriate values may be used for the bandpass filter. For example, the bandpass filter may operate so that any value that is less than 0.1 is clamped to 0 and any value greater than 0.9 is clamped to 1.

The noiseImage (also referred to as a noise image dataset) is an image that corresponds to (i.e. has the same pixel dimensions as) the input image x but is comprised of random noise (e.g. salt and pepper noise). The generateNoise function may generate the noiseImage in various ways, for example by a library function that generates a 2D noise image.

The noiseMask (also referred to as a noise mask dataset) is a mask with the same pixel dimensions as the input image x. The noiseMask is generated by combining the noiseImage and the frequency image. As can be seen, the noiseMask is generated so that each pixel of the noiseMask defines noise and the strength of a given noise mask pixel is based on the frequency of the corresponding pixel in the input image. More specifically, pixels in the noise mask that correspond to low frequency regions in the input image (which have corresponding frequencyImage values approaching or equal to zero) have higher strength noise (as (1.0−frequencyImage) approaches (or equals) 1). Conversely, pixels in the noise mask that correspond to high frequency regions in the input image x (which have corresponding frequencyImage values approaching or equal to 1) have lower strength noise (as (1.0−frequencyImage) approaches (or equals) 0).

Finally, the noise-added version of the input image x is returned by applying the noiseMask to the input image x, taking into account the defined noiseStrength. In the noise-added version of the input image as returned, higher strength noise has been applied to low frequency regions of the input image while lower strength noise has been applied to high frequency regions of the input image.

While the addNoise function described above provides an example algorithm for identifying low frequency regions in the first input frame adding noise to those regions, alternative approaches to identifying low frequency regions and/or adding noise to such regions may be adopted.

At 206, following generation of the noised added frame ($d_x$), the style transfer module 502 generates an output frame (denoted $o_x$) that corresponds to the input frame ($f_x$) currently being processed. The output frame generated at 206 is a style transferred frame and is generated by processing the noise-added (deformed) frame $d_x$ and the reference image in accordance with a style transfer process.

At 208, the style transfer module 502 determines if there are further frames from the input video to be processed—i.e. any input frames for which corresponding output frames have not yet been generated. In response to determining there are further input frames to be processed, processing proceeds to 210. In response to determining that no further input frames require processing, proceeds to 222.

At 210, the style transfer module 502 obtains the next unprocessed frame of the input video. Input video frames are processed in order. Accordingly, if the input frame that was previously processed was $f_x$, the next input frame obtained at 210 will be $f_{x+1}$. The frame obtained at 210 will be referred to as the current input frame.

At 212, the style transfer module 502 determines whether generation of a new noise-added frame is required. In response to determining generation of a new noise-added frame is required processing returns to 204. In response to determining generation of a new noise-added frame is not required processing proceeds to 214.

The style transfer module 502 may determine that a new noise-added frame is required in various ways.

As one example, the input video being processed may be made up of one or more video scenes (defined, for example, by metadata associated with the input video). In this case, if the input frame $f_x$ obtained at 210 belongs to a new scene (i.e. different scene to that which the previous input frame $f_{x-1}$ belonged to) the style transfer module 502 may be configured to determine that a new noise-added frame is required.

As another example, if the input video format makes use of keyframes—e.g. H.264, MPEG-2, MPEG-4 formats—style transfer module 502 may also (or alternatively) be configured to determine that any keyframe of the input video requires generation of a new noise-added frame (while p-frames and b-frames do not).

As another example, style transfer module 502 may also (or alternatively) be configured to determine that a new noise-added frame is required if a defined number of frames have been processed without generating a new (e.g. intermediate) noise-added frame. In this case any appropriate number of frames may be defined—for example 10 frames.

At 214, a new noise-added frame does not need to be generated. In this case, the style transfer module 502 obtains optical flow data that describes the optical flow between the preceding input video frame ($f_{x-1}$) and the current input video frame ($f_x$). Generally speaking, the optical flow data describes how the positions of pixels in a first frame ($f_{x-1}$) have changed in a second frame ($f_x$). The optical flow data between two frames $f_{x-1}$ and $f_x$ will be denoted $oF_{(x-1, x)}$.

The style transfer module 502 may obtain optical flow data at 214 by calculating it at 214. This may involve, for example, passing the preceding and current frames ($f_{x-1}$ and $f_x$) to an optical flow function that outputs the optical flow data. Alternatively, optical flow data for the entire input video may be calculated as part of a separate process (by the style transfer module 502 or an alternative module) and the optical flow data relevant to the preceding and current frames accessed from that dataset by the style transfer module 502 at 214.

Optical flow data may be calculated (by the style transfer module 502 or an alternative module) by calling an optical flow function which takes the video frames in question ($f_{x-1}$, $f_x$) as inputs and outputs the optical flow data. The optical flow function may be a dense optical flow function which attempts to calculate an optical flow vector for each pixel in the first video frame. In this case, the optical flow data defines a vector for each pixel in the first video frame ($f_{x-1}$). The vector for a given pixel indicates the displacement (distance and direction) of that pixel to a corresponding pixel in the second video frame ($f_x$).

Any appropriate optical flow function may be used. By way of example, an optical flow function based on the approach described in the paper "Two-Frame Motion Estimation Based on Polynomial Expansion" by Gunnar Farneback may be used. One example implementation of this function is the OpenCV (Open Source Computer Vision Library) implementation. Alternative approaches may be used to calculate optical flow data including, for example, deep learning optical flow techniques.

In certain implementations, the style transfer module 502 may be configured to generate (or obtain) optical flow data that is based on both a forward optical flow (i.e. the optical flow calculated from video frames $f_{x-1} \rightarrow f_x$) and a reverse optical flow (i.e. the optical flow calculated from video frames $f_x \rightarrow f_{x-1}$). In this case, the optical flow data obtained or generated at 214 may be obtained by calculating forward optical flow data (e.g. $oF_{(x-1,x)}$) and reverse optical flow data (e.g. $oF_{(x,x-1)}$) and reconciling the vector fields defined by the forward and reverse optical flow data. Various approaches to reconciling forward and reverse optical flow data may be used, for example by averaging.

In embodiments where forward and reverse optical flow data is calculated, the style transfer module 502 may also be configured to determine whether a new noise-added frame needs to be generated based on that data at 216. Specifically, in such embodiments the style transfer module 502 may compare the forward optical flow data that is relevant to the input frame (e.g. $oF_{(x-1,x)}$) with the reverse optical flow data that is relevant to the input frame (e.g. $oF_{(x,x-1)}$) to determine if there is significant disagreement. Determining whether the forward and reverse optical flow agree or disagree can be performed in various ways, as is known in the art.

If the style transfer module 502 determines that there is significant disagreement between the forward and reverse optical flow data for a given pair of adjacent frames, this may be taken as an indicator that there has been a significant change in composition. In this case processing proceeds to 204 (and the style transfer module 502 generates a new noise-added frame for the current input frame $f_x$). If there is not significant disagreement between the forward and reverse optical flow data, processing proceeds to 218.

At 218, optical flow data has been calculated and the style transfer module has not determined that a new noise-added frame needs to be generated for the current input frame ($f_x$). In this case, the style transfer module 502 generates what will be referred to as a noise-preserved frame that corresponds to the current frame, G. The noise-preserved frame is another type of deformed frame. Accordingly, the noise-preserved frame corresponding to input frame $f_x$ will be denoted/referred to as deformed frame $d_x$.

Style transfer module 502 generates the noise-preserved frame $d_x$ at 218 by using the optical flow data obtained at 210 to warp or deform the deformed frame that corresponds to the preceding input frame—i.e. $d_{x-1}$.

For example, if the current input frame is frame x ($f_x$), then the corresponding noise-preserved frame ($d_x$) is generated by using the optical flow data that describes the optical flow between the preceding input frame ($f_{x-1}$) and the current input frame ($f_x$) (i.e. $oF_{(1,2)}$) to deform the deformed frame corresponding to the preceding input frame ($d_1$).

More generally, if the current frame is input frame x ($f_x$), then the corresponding noise-preserved frame ($d_x$) is generated using: the optical flow data that describes the optical flow between the preceding input frame ($f_{x-1}$) and the current input frame ($f_x$) (i.e. $oF_{(x-1,x)}$); and the deformed frame corresponding to the preceding input frame ($d_{x-1}$).

By using the optical flow data to deform or warp the previous deformed frame, the artificial noise that was added (in the case the previous deformed frame was a noise-added frame) or preserved (in the case the previous deformed frame was itself a noise-preserved frame) is preserved.

Style transfer module 502 may be configured to deform or warp the previous deformed frame using the optical flow data in various ways. Consider, for example, two images I1 and I2, and a optical flow field (i.e. optical flow data), O. The field O describes the mapping between pixels in I2 and I1. These all can be sampled at a position using (x,y). I2', which is made up of pixels in I1, can be calculated by processing each pixel in the image I1 and calculating a corresponding pixel I2'(x,y)=I1 ((x,y)+O(x,y)). That is to say, the new pixel comes from nearby the corresponding pixel in I1, but offset by the optical flow.

At 220, the style transfer module 502 generates a style transferred output frame ($o_x$) corresponding to the current input frame ($f_x$). The output frame is generated as per 206 described above, excepting the style transform is performed on the noise-preserved deformed frame $d_x$ that corresponds to the current frame $f_x$.

At 222, style-transferred output frames corresponding to all frames of the input video have been generated. In this case, style transfer module 502 uses the output frames ($o_1$ to $o_n$) to generate an output video. To do so, style transfer module 502 may, for example, pass the output frames to a video encoding application or process in order to generate an output video of the desired video format. Any appropriate encoding process may be used. As the output video is generated using style transferred frames, the output video may be referred to as a style transferred video.

At 224, the style transfer module 502 returns the style transferred output video generated at 222. The output video may be returned to an application or process that called the style transfer process or to an alternative default or defined endpoint. By way of example, a user may specify (via an appropriate user interface) that the output video is to be saved to a particular location (local or networked), communicated via a communication mechanism (e.g. email, instant message, file transfer protocol, or other communication mechanism), or uploaded to a website or other server. The output video may also be played by an appropriate playback application or device.

Process 200 is then complete.

Figure 3:
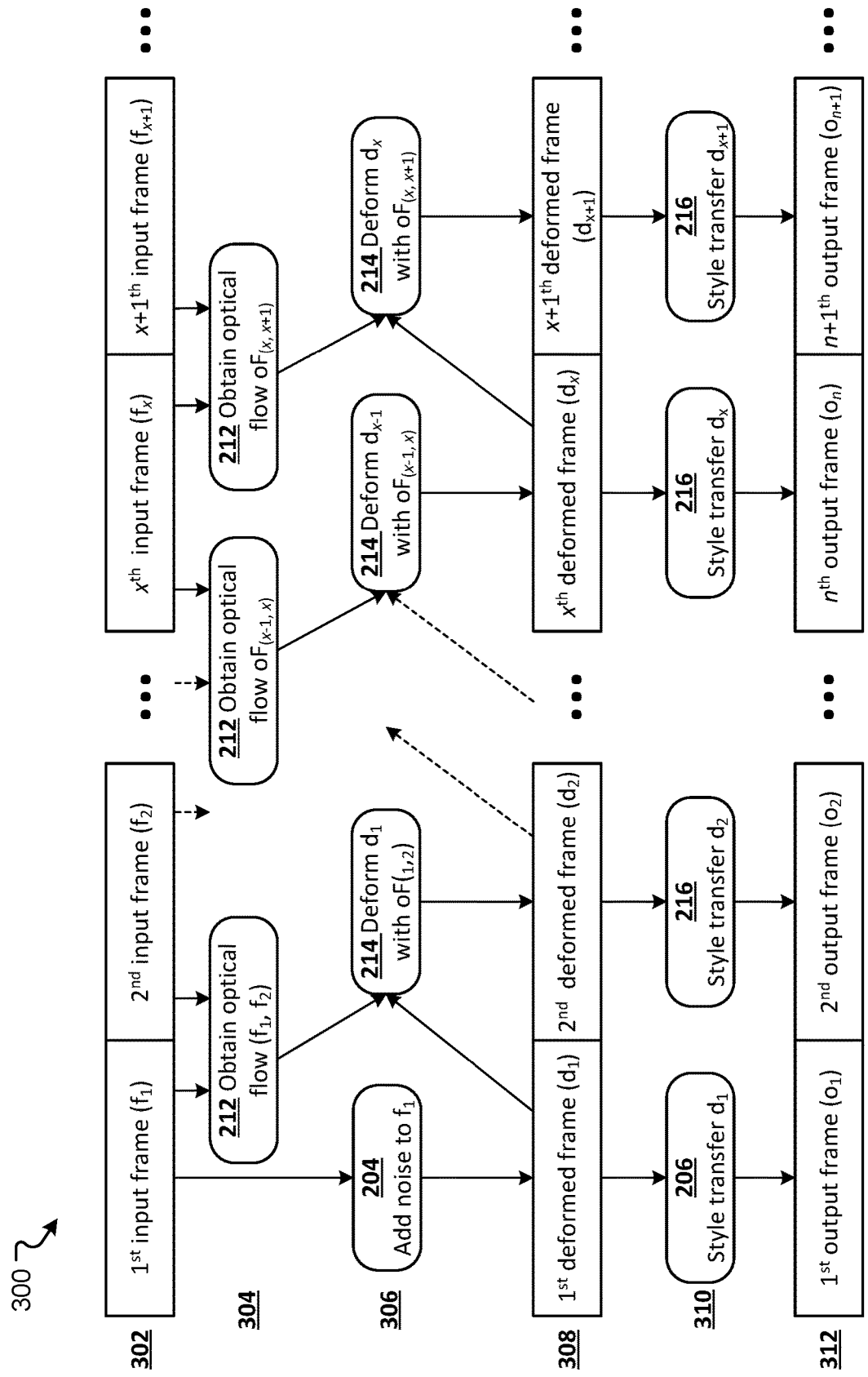
FIG. 3 provides a further depiction of operations performed in a video style transfer method.

Turning to FIG. 3, a graphical depiction 300 of process 200 is provided. In depiction 300 a single noise-added frame is generated ($d_1$ corresponding to $f_1$) and noise-preserved frames are generated for the remaining frames.

In FIG. 3, the square-corner rectangles indicate images or frames (e.g. two- or higher-dimensional image arrays or alternatively formatted image data) and the rounded-corner rectangles indicate processing. Specifically: the topmost row 302 indicates the frames of the input video obtained/decoded at operation 202 (re input frame 1) and operation 210 (re input frames 2 to n); the next row 304 indicates processing performed to obtain optical flow data (not relevant to input frame 1); the next row 306 indicates the processing performed to generate the deformed frames (i.e. the noise-added frame corresponding to input frame 1 and, in this example, the noise-preserved frames corresponding to input frames 2 to n); the next row 308 indicates the deformed frames $d_1$ to $d_n$ generated by operation 204 (re input frame 1) and operation 218 (re input frames 2 to n); the next row 310 indicates style transfer processing of the deformed frames $d_1$ to $d_n$; and the final row 312 indicates the output, style transferred frames of to on generated by operation 206 (re input frame 1) and operation 220 (re input frames 2 to n).

Figure 4:
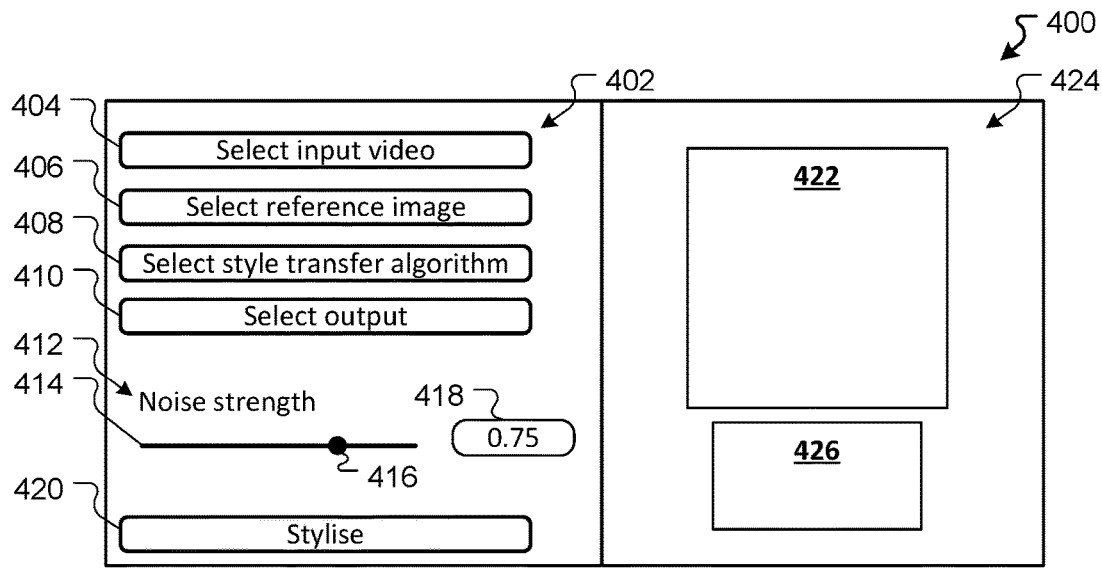
FIG. 4 depicts an example graphical user interface.

Turning to FIG. 4, an example graphical user interface (GUI) 400 is depicted. A user may interact with GUI 400 to create a style-transferred video.

In the present example, GUI 400 is generated by a video editing application 704 which causes GUI 400 to be displayed on a display (e.g. 118), receives inputs from one or more input devices that are made with respect to GUI 400, invokes the style transfer module 502 to generate a style-transferred video based on those inputs, and provides output options with respect to the style-transferred video returned by the style transfer module. In alternative embodiments, GUI 400 be generated by the style transfer module 502 itself.

Example GUI 400 includes an input region 402 which, in this example, includes: an input video selection control 404; a reference image selection control 406; a style transfer algorithm selection control 410; an output format selection control 412; a noise strength selection control 414 (which in this case is a slider-type control including a slide path 414, a slide handle 416, and a noise control readout 418); and a commence video stylisation control 420.

The input video selection control 404 can be activated by a user to select an input video that is to be stylised. For example, in response to detecting activation of the input video selection control the, a selection user interface by which a user can search or browse for an input video. This may allow searching/browsing of locally accessible memory (e.g. 110), remote data storage devices, and/or searching/browsing via the Internet. In the present example, a preview 422 of the selected input video (e.g. the first frame thereof, or a playing video) is displayed in preview region 424 of GUI 400.

The reference image selection control 406 can be activated by a user to select an input video that is to be stylised. For example, in response to detecting activation of the reference image selection control, a selection user interface may be launched by which a user can search or browse for a reference image. This may allow searching/browsing of locally accessible memory (e.g. 110), remote data storage devices, and/or searching/browsing via the Internet. In the present example, a preview 426 of the selected reference image is displayed in preview region 424 of GUI 400.

In the present example, the style transfer algorithm selection control 408 can be activated by a user to select a particular style transfer algorithm that is to be used. For example, in response to detecting activation of the style transfer algorithm selection control, a selection user interface may be launched which allows a user to select from available style transfer algorithms. In alternative embodiments, a default/predefined style transfer algorithm may be used by the style transfer module 502, in which case this control need not be provided.

In the present example, the output format selection control 412 can be activated by a user to select a particular output format for the style-transfer video that is to be generated. In alternative embodiments a default/predefined output format may be used by the style transfer module, in which case this control need not be provided.

In the present example, the noise strength selection control 414 can be activated by a user to set different values for the noiseStrength variable that is to be used in the style transfer process. This allows a user to set different noiseStrength values and view the results. In alternative embodiments a default/predefined noiseStrength value may be used by the style transfer module, in which case this control need not be provided.

The commence video stylisation control 420 can be activated by a user to initiate the style transfer process. For example, activation of this control causes the style transfer module 502 to perform a style transfer process with inputs of: the input video selected via control 404; the reference image selected via control 406; the style transfer algorithm selected via control 408 (if applicable); the output format selected via control 410 (if applicable); and the noiseStrength value selected via control 412 (if applicable).

Once the style-transferred video has been generated, it may be previewed in the preview region 424 (replacing display of the selected input video preview 422 and selected reference image preview 426). In addition, a save/share control may be displayed which a user can activate to save the output video (to local or remotely accessible memory) and/or share the output video (e.g. by uploading to a website, attaching to an instant message, attaching to an email, sharing via a social media application/platform).

GUI 500 as depicted and described is an example GUI only. It will be appreciated that alternative GUIs (with additional, fewer, or alternative GUI components/controls/elements) may be provided to allow a user to select inputs and create a style-transferred video. It will be also be appreciated that when GUI 500 is provided by a video editing application such as 704, that application will typically provide additional functions to those depicted and described.

As noted, the processing described here in s performed by one or more computer processing systems that are configured (by hardware and/or software) to do so. In the specific examples, a style transfer module 502 and video editing application 504 have been described for illustrative purposes. Alternative implementations are, however possible.

By way of further illustration, FIG. 6 provides several potential architectures 500 in which the techniques described herein could be performed. Alternative architectures are possible.

Figure 5:
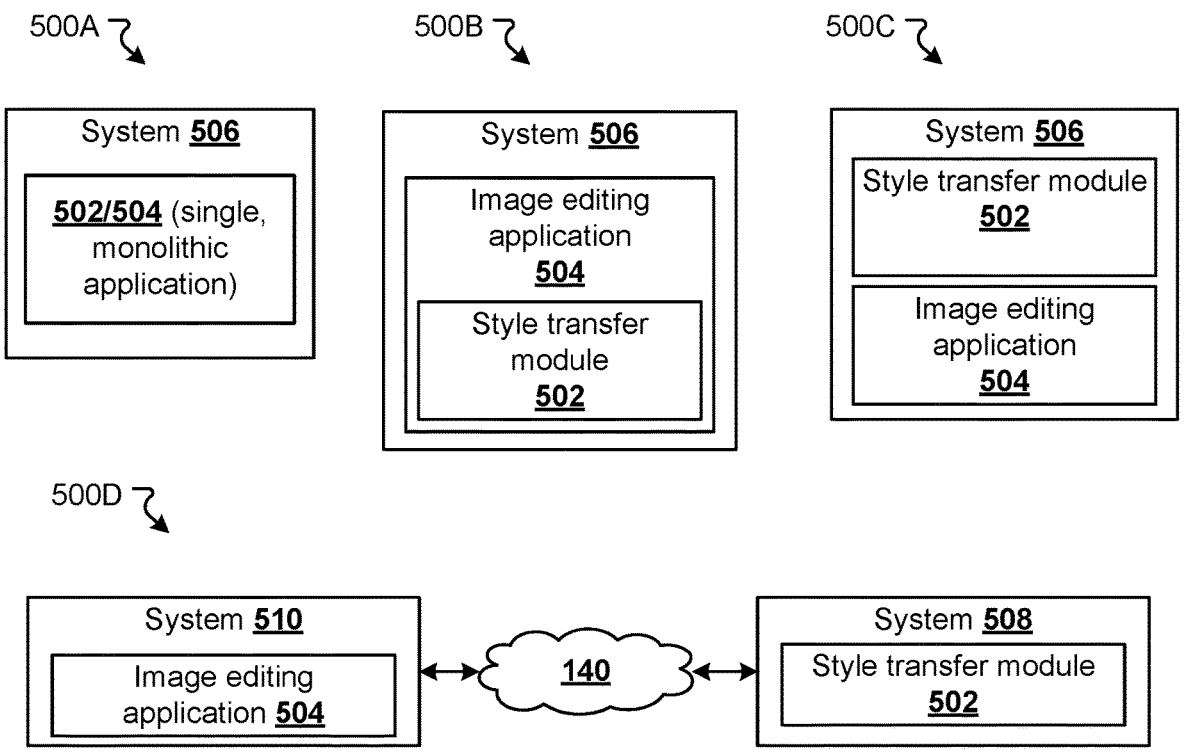
FIG. 5 depicts various architectures in which the features of the present disclosure may be implemented.

In example architecture 500A, a single style transfer module 502 is provided. In this example, computer processing system 506 is configured by the style transfer module 502 to perform all operations described herein (including providing/controlling a user interface such as that described with reference to FIG. 5).

In example architecture 500B, the style transfer module 502 is a plug-in or add-on to a video editing application 504 (the video editing application 504 providing various video editing functions and, for example, an interface such as GUI 400 described above which provides users with access to the video style transfer functionality).

In example architectures 500C and 500D, the style transfer module 502 and video editing application 504 are entirely separate software applications. In example architecture 500C, applications 502 and 504 run on the same computer processing system 506. In this case applications 502 and 504 may communicate with each other by any appropriate communication protocol.

In example architecture 500D, the style transfer module 502 runs on a server computer processing system 508 and video editing application 504 is a client application that runs on user device (another computer processing system) 510. In this example, video editing application 504 provides a front-end application that may include a GUI such as 400 described above. Video editing application 504 then communicates with the style transfer module 502 (potentially via a server application running at system 508, not shown) to cause the style transfer module 502 to perform the style transfer process. The style-transferred video that is generated is then returned to the video editing application 504 for display on system 510. In this case, the video editing application 504 and style transfer module 502 may communicate with each other by any appropriate communication protocol (e.g. http, https, defined API calls, or any other suitable protocol).

In method 200, the noise-added to the low frequency regions of the initial video frame at 204 provides the style transfer algorithm statistical "anchor" points within those low frequency regions. As processing continues, preserving this noise in subsequent frames (by generating successive noise-preserved frames at 218) means that the noise in the low frequency regions of adjacent frames should be similar and, therefore, the style-transferred output frames should also be similar. When the output frames are encoded into (and viewed as) a video, this reduces undesirable visual artefacts such as the 'sizzling' and 'popping' described above.

For the purposes of description, the operations of method 200 have been presented sequentially and in a particular order. Various adaptations are, however, possible. As one example, while method 200 describes that a given output frame $o_x$ is generated immediately after the corresponding deformed frame $d_x$ has been generated, this need not be the case. For example, method 200 could be adapted to store a set of deformed frames and only generate output frames once all deformed frames (corresponding to all input frames) have been generated.

More generally, and in some instances, one or more operations described in method 200 may be able to be combined into a single operation, a single operation may be divided into multiple separate operations, and/or the function(s) achieved by one or more of the described/illustrated operations may be achieved by one or more alternative operations.

Still further, while method 200 provides an end-to-end process for generating a style transferred video this need not be the case. For example, method 200 could be adapted to instead output a set of deformed frames that correspond to the input video frames. Those deformed frames may then be used to generate a style-transferred video by another user or downstream process.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method including:
   accessing an input video;
   generating a first output frame corresponding to a first input frame of the input video by:
      generating a noise-added frame by processing the first input frame to add noise to any low-frequency regions only of the first input frame; and
      processing the noise-added frame in accordance with a stylization algorithm to generate the first output frame;
   generating a second output frame corresponding to a second input frame of the input video, wherein the second input frame is subsequent to the first input frame and the second output frame is generated by:
      obtaining first optical flow data describing an optical flow between the first input frame and the second input frame;
      generating a first noise-preserved frame by using the first optical flow data to deform the noise-added frame; and
      processing the first noise-preserved frame in accordance with the stylization algorithm to generate the second output frame; and
   encoding the first output frame and the second output frame into output video data.

2. The computer implemented method of claim 1, further including:
   generating a third output frame corresponding to a third input frame of the input video, wherein the third input frame is subsequent to the second input frame and the third output frame is generated by:
      calculating second optical flow data describing an optical flow between the second input frame and the third input frame;
      generating a second noise-preserved frame by using the second optical flow data to deform the first noise-preserved frame; and
      processing the second noise-preserved frame in accordance with the stylization algorithm to generate the second output frame; and
   encoding the third output frame into the output video data.

3. The computer implemented method of claim 1, wherein generating the noise-added frame includes:
   generating a noise mask dataset defining noise mask pixels that correspond to input frame pixels defined by the first input frame, wherein each noise mask pixel defines a noise strength and the noise strength defined by a given noise mask pixel is based on a frequency of the first input frame pixel that the given noise mask pixel corresponds to; and
   applying the noise mask dataset to the first input frame.

4. The computer implemented method of claim 3, wherein generating the noise mask dataset includes:
   generating a frequency dataset defining frequency dataset pixels that correspond to the first input frame pixels, wherein each frequency dataset pixel defines a frequency value and the frequency value defined by a given frequency dataset pixel is based on a frequency of the first input frame pixel that the given frequency dataset pixel corresponds to; and
   combining the frequency dataset with a noise image dataset.

5. The computer implemented method of claim 4, wherein generating the frequency dataset includes:
   generating a greyscale image corresponding to the first input frame; and
   processing the greyscale image using a Fast Fourier Transform (FFT) algorithm to generate a FFT version of the first input frame.

6. The computer implemented method of claim 5, wherein generating the frequency dataset further includes:
   applying a bandpass filter to the FFT version of the first input frame.

7. The computer implemented method of claim 4, wherein the noise image dataset defines noise image pixels that correspond to the input frame pixels, each noise image pixel defining a random amount of noise.

8. The computer implemented method of claim 4, further including:
   determining that a further output frame is to be generated, the further output frame corresponding to a further input frame of the input video;
   determining whether a new noise-added frame is required; and
   in response determining that the new noise-added frame is required:
   generating the new noise-added frame by processing the further input frame to add noise to any low-frequency regions of the further input frame; and
   processing the new noise-added frame in accordance with the stylization algorithm to generate the further output frame.

9. The computer implemented method of claim 8, wherein determining whether the new noise-added frame is required includes:
   determining whether there has been a change in composition between the further input frame and a preceding input frame of the input video; and
   in response to determining that there has been a change in composition between the further input frame and the preceding input frame, determining that the new noise-added frame is required.

10. The computer implemented method of claim 9, wherein determining whether there has been a change in composition between the further input frame and the preceding input frame includes:
    obtaining forward optical flow data in respect of a forward optical flow from the preceding input frame to the further input frame;
    obtaining reverse optical flow data in respect of a reverse optical flow from the further input frame to the preceding input frame; and
    determining whether the forward optical flow data and the reverse optical flow data disagree; and
    in response to determining that the forward optical flow data and the reverse optical flow data disagree, determining that there has been a change in composition.

11. The computer implemented method of claim 8, wherein determining whether the new noise-added frame is required includes one or more of:
    a) determining whether the further input frame belongs to a new scene of the input video; and
    in response to determining that the further input frame belongs to the new scene of the input video, determining that the new noise-added frame is required;
    b) determining whether the further input frame is a keyframe; and
    in response to determining that the further input frame is a keyframe, determining that the new noise-added frame is required;
    c) determining whether a defined number of input frames have been processed without generating an intermediate noise-added frame; and
    in response to determining that the defined number of input frames have been processed without generating the intermediate noise-added frame, determining that the new noise-added frame is required.

12. The computer implemented method of claim 1, further including one or more of playing the output video on a display, saving the output video to non-transient memory, uploading the output video to a remove server.

13. A computer processing system including:
    a processing unit; and
    a non-transient computer-readable storage medium storing instructions, which when executed by the processing unit, cause the processing unit to perform a method including:
    accessing an input video;
    generating a first output frame corresponding to a first input frame of the input video by:
       generating a noise-added frame by processing the first input frame to add noise to any low-frequency regions only of the first input frame; and
       processing the noise-added frame in accordance with a stylization algorithm to generate the first output frame;
    generating a second output frame corresponding to a second input frame of the input video, wherein the second input frame is subsequent to the first input frame and the second output frame is generated by:
       obtaining first optical flow data describing an optical flow between the first input frame and the second input frame;
       generating a first noise-preserved frame by using the first optical flow data to deform the noise-added frame; and
       processing the first noise-preserved frame in accordance with the stylization algorithm to generate the second output frame; and
    encoding the first output frame and the second output frame into output video data.

14. The computer processing system of claim 13, wherein the method further comprises:
    generating a third output frame corresponding to a third input frame of the input video, wherein the third input frame is subsequent to the second input frame and the third output frame is generated by:
       calculating second optical flow data describing an optical flow between the second input frame and the third input frame;
       generating a second noise-preserved frame by using the second optical flow data to deform the first noise-preserved frame; and
       processing the second noise-preserved frame in accordance with the stylization algorithm to generate the second output frame; and
    encoding the third output frame into the output video data.

15. The computer processing system of claim 13, wherein generating the noise-added frame includes:
    generating a noise mask dataset defining noise mask pixels that correspond to input frame pixels defined by the first input frame, wherein each noise mask pixel defines a noise strength and the noise strength defined by a given noise mask pixel is based on a frequency of the first input frame pixel that the given noise mask pixel corresponds to; and
    applying the noise mask dataset to the first input frame.

16. The computer processing system of claim 15, wherein generating the noise mask dataset includes:

generating a frequency dataset defining frequency dataset pixels that correspond to the input frame pixels, wherein each frequency dataset pixel defines a frequency value and the frequency value defined by a given frequency dataset pixel is based on a frequency of the first input frame pixel that the given frequency dataset pixel corresponds to; and combining the frequency dataset with a noise image dataset.

17. The computer processing system of claim 16, wherein the method further comprises:

determining that a further output frame is to be generated, the further output frame corresponding to a further input frame of the input video;

determining whether a new noise-added frame is required; and in response determining that the new noise-added frame is required:

generating the new noise-added frame by processing the further input frame to add noise to any low-frequency regions of the further input frame; and processing the new noise-added frame in accordance with the stylization algorithm to generate the further output frame.

18. The computer processing system of claim 17, wherein determining whether the new noise-added frame is required includes one or more of:

a) determining whether there has been a change in composition between the further input frame and a preceding input frame of the input video; and in response to determining that there has been a change in composition between the further input frame and the preceding input frame, determining that the new noise-added frame is required;

b) determining whether the further input frame belongs to a new scene of the input video; and in response to determining that the further input frame belongs to the new scene of the input video, determining that the new noise-added frame is required;

c) determining whether the further input frame is a keyframe; and in response to determining that the further input frame is a keyframe, determining that the new noise-added frame is required;

d) determining whether a defined number of input frames have been processed without generating an intermediate noise-added frame; and in response to determining that the defined number of input frames have been processed without generating the intermediate noise-added frame, determining that the new noise-added frame is required.

19. A non-transient storage medium storing instructions executable by processing unit to cause the processing unit to perform a method comprising:

accessing an input video;

generating a first output frame corresponding to a first input frame of the input video by:

generating a noise-added frame by processing the first input frame to add noise to any low-frequency regions only of the first input frame; and processing the noise-added frame in accordance with a stylization algorithm to generate the first output frame;

generating a second output frame corresponding to a second input frame of the input video, wherein the second input frame is subsequent to the first input frame and the second output frame is generated by:

obtaining first optical flow data describing an optical flow between the first input frame and the second input frame;

generating a first noise-preserved frame by using the first optical flow data to deform the noise-added frame; and processing the first noise-preserved frame in accordance with the stylization algorithm to generate the second output frame; and encoding the first output frame and the second output frame into output video data.

20. The non-transient storage medium of claim 19, wherein the method further comprises:

generating a third output frame corresponding to a third input frame of the input video, wherein the third input frame is subsequent to the second input frame and the third output frame is generated by:

calculating second optical flow data describing an optical flow between the second input frame and the third input frame;

generating a second noise-preserved frame by using the second optical flow data to deform the first noise-preserved frame; and processing the second noise-preserved frame in accordance with the stylization algorithm to generate the second output frame; and encoding the third output frame into the output video data.

* * * * *